(12) United States Patent
Chien

(10) Patent No.: US 8,545,090 B2
(45) Date of Patent: Oct. 1, 2013

(54) LED NIGHT LIGHT WITH INTERCHANGEABLE DISPLAY UNIT

(76) Inventor: Tseng-Lu Chien, Taipei Hseng (TW)

( * ) Notice: Subject to any disclaimer, the term of this patent is extended or adjusted under 35 U.S.C. 154(b) by 116 days.

(21) Appl. No.: 11/527,629

(22) Filed: Sep. 27, 2006

(65) Prior Publication Data

US 2007/0076439 A1    Apr. 5, 2007

(51) Int. Cl.
*H01R 33/00* (2006.01)
(52) U.S. Cl.
USPC ........... 362/641; 362/642; 362/643; 362/644; 362/149; 362/562
(58) Field of Classification Search
USPC ................. 362/641, 642, 643, 644, 562, 149, 362/84, 276
See application file for complete search history.

(56) References Cited

U.S. PATENT DOCUMENTS

| | | | | |
|---|---|---|---|---|
| 3,203,126 A * | 8/1965 | Sol | ................................. | 40/553 |
| 3,962,574 A * | 6/1976 | Zurla | ............................ | 362/411 |
| 4,912,609 A * | 3/1990 | Gillette | ......................... | 362/147 |
| 6,905,231 B2 * | 6/2005 | Dickie | ........................... | 362/271 |
| 6,929,376 B2 * | 8/2005 | Harris | ............................. | 362/20 |
| 2005/0201081 A1* | 9/2005 | Brady | ............................ | 362/101 |
| 2006/0062019 A1* | 3/2006 | Young | ........................... | 362/641 |

* cited by examiner

*Primary Examiner* — Jong-Suk (James) Lee
*Assistant Examiner* — Mark Tsidulko
(74) *Attorney, Agent, or Firm* — Bacon & Thomas, PLLC

(57) ABSTRACT

An LED night light with interchangeable display unit can be separated from the base when a predetermined force is applies to reduce the chance that the prong device will be damaged by pulling, pushing, or twisting. The display unit may have a built-in or separate input-end to accommodate a receptacle means of the base. An LED related circuit, prong means and other control device may be disposed in the base or incorporated with a sealed-unit to cause the light beam to be seen by a viewer through the display area and provide a dedicated artwork, design, motion liquid, and/or dimensional colored image for illumination.

4 Claims, 6 Drawing Sheets

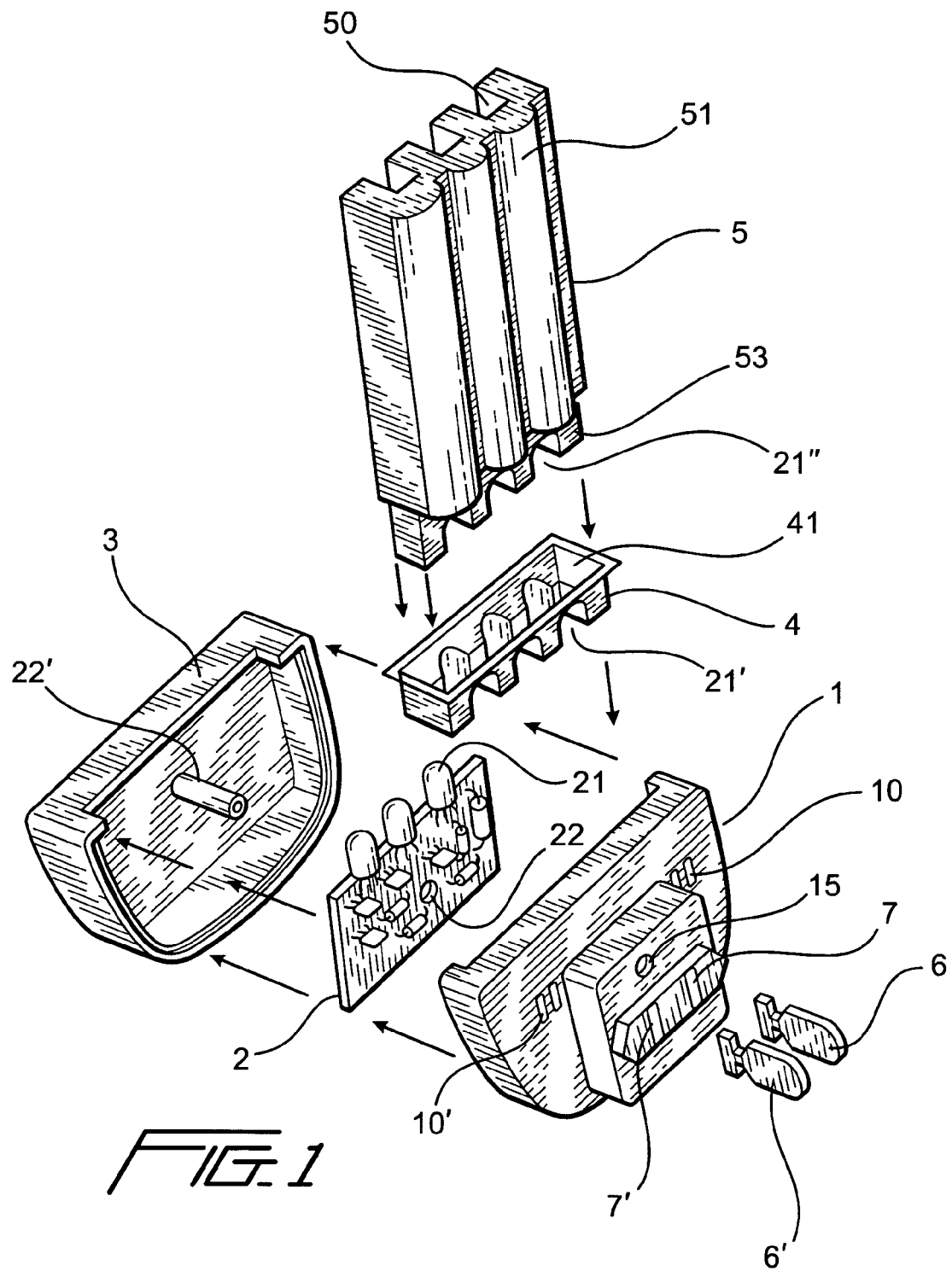

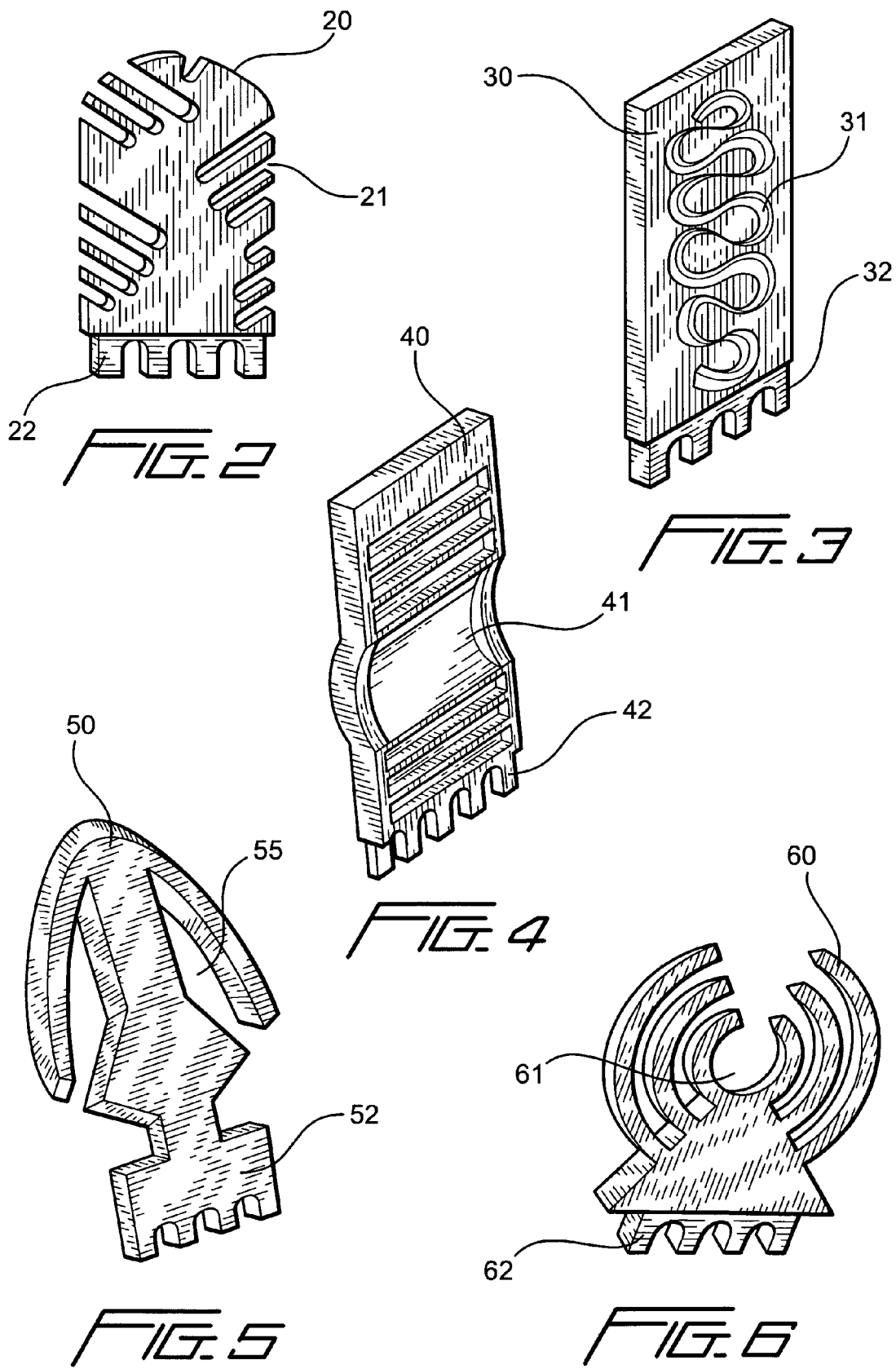

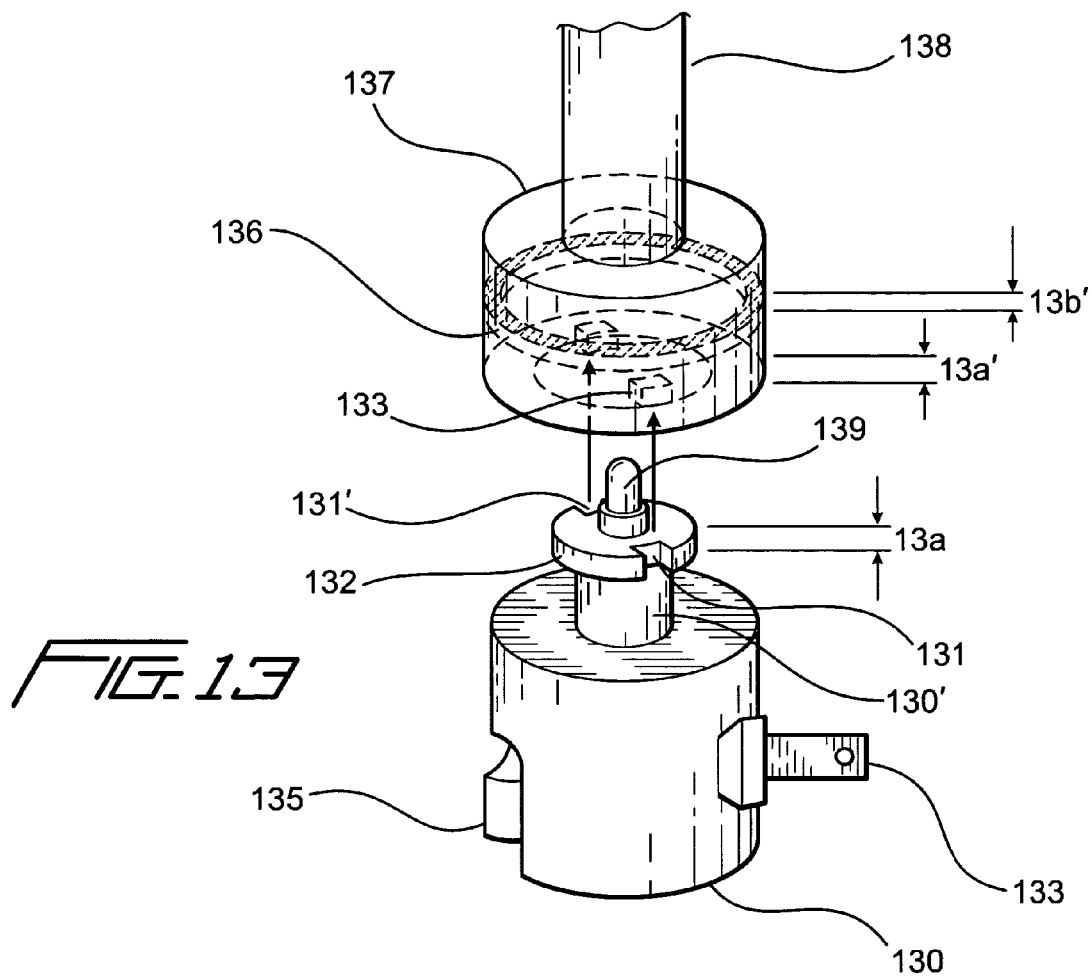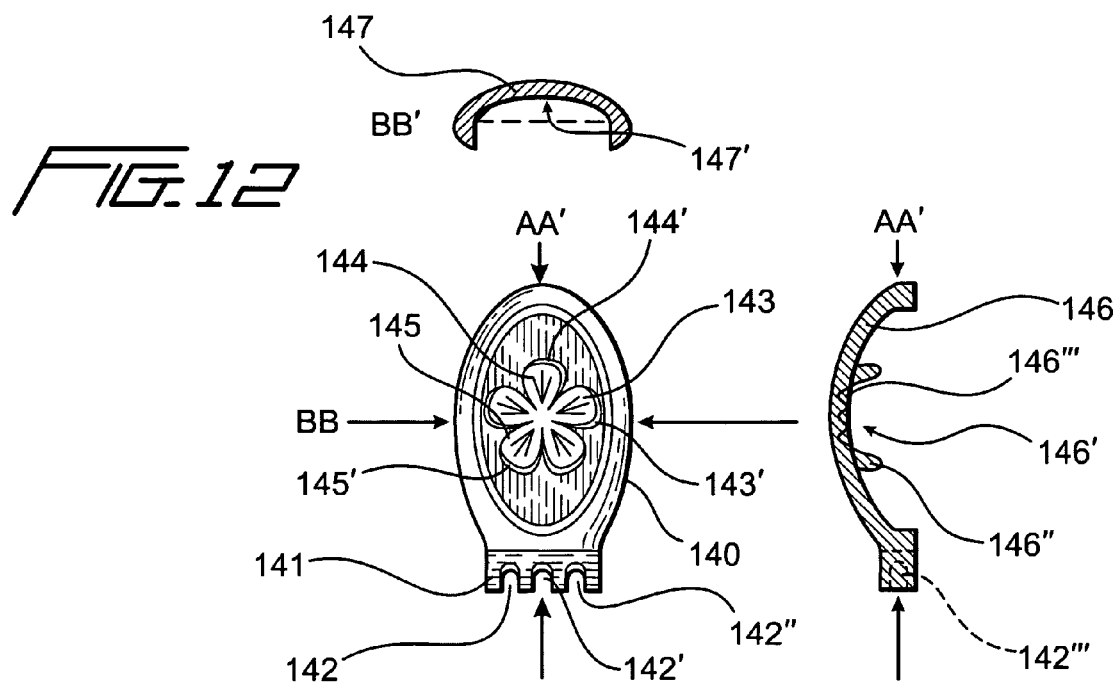

LED NIGHT LIGHT WITH INTERCHANGEABLE DISPLAY UNIT

This application is related to U.S. patent application Ser. Nos. 10/954,189, filed Oct. 1, 2004; 11/094,155, Mar. 31, 2005; 11/094,156, filed Mar. 31, 2005; 10/667,787, filed Sep. 23, 2003; 10/286,871, filed Nov. 4, 2002; 10/621,513, filed Jul. 18, 2003; 11/094,215, filed Mar. 31, 2005; 11/255,981, filed Oct. 24, 2005; 11/527,631, filed Sep. 21, 2006; and 11/527,628, filed Sep. 27, 2006.

BACKGROUND

The current invention provides an LED night light with, according to a first aspect of the invention, an interchangeable display unit that offers a very safe design to keep people away from exposed prong means and prevent electric shock. In the interchangeable display unit, the display unit will be separated upon being subject to pulling, pushing, twisting, kicking, dropping, or other impact so the force applied to the prong means will be reduced because the display unit has already separated from the base, minimizing the transfer of torque or force and reducing harm to the base's prong means. This will protect the prong means under any potential impact strength that may be applied to the night light.

The preferred LED night light with interchangeable display unit further features, according to a second aspect of the invention, a sealed-unit in which all components that come into contact with live wires having a very high voltage under a certain frequency are isolated to protect people from harm, the sealed-unit ensuring that all components are sealed within the safest part of the housing to prevent people from touching these dangerous parts under any condition. The sealed-unit may seal the LED circuit, prong means, control means, and related parts within a qualified material case to form a sealed-unit that meets required safety standards so that all other housing parts can use any material without limitation because the safety qualified material is the only material to touch the live wires.

According to a third aspect of the invention, the LED night light with interchangeable display unit provides a different display unit which has a display area and display input-ends for quick installation to provide the most eye-catching light effects by enabling different display area designs to be selected. The designs may include any of the following (1) a display area having a predetermined treatment selected from opening(s), cut-out(s), and/or hole(s) on its surface to provide desired light effects and performance, (2) a display area having space to load a liquid, chemical compound, miniatures, floating stuff, reflective pieces, liquids of different density, printing background, screen, or desired combination of listed items within the said space, and/or (3) display area having a curved egg-shell shape with a negative or positive engraving process applied to an inner surface with sufficient depth to provide a three-dimensional effect and make the design, art-work character, drawing, or cartoons look alive. According to a fourth aspect of the invention, the LED night light with interchangeable display unit includes a display area and separate display input-end, the night light base having at least one prong means to connect with the power source and one receptacle means to receive the display input-end. The LED light means is connected to a related circuit, control means, and prong means to cause the LED to be turned on according to predetermined functions and for a predetermined period of time. Advantageously, the receptacle means is built-in to the base as one piece which enables the receptacle means to isolate live wires and components and keep them away from people. The display input-end is connected with the receptacle means to get light, heat, or other desired physical phenomena from an inner electric device within the base. The display area has a geometric shape with space to load a liquid, chemical compound, miniatures, floating stuff, a reflective piece, different density liquids, a printing background, a screen, a solid plastic resin with geometric air bubble inside, and/or a desired combination of listed items within the space. This feature will provide the night light with excellent safety and splendid light effects.

According to a fifth aspect of the invention, the LED night light with interchangeable display unit includes a display unit selected from any combination of a liquid filled unit, solid plastic unit with air bubble within, solid plastic unit with laser engraving within, curved plastic with three-dimensional engraving art, a plastic piece with cut-out(s), or equivalent treatments. The display area has a geometric shape with space to load a liquid, chemical compound, miniatures, floating stuff, a reflective piece, different density liquids, a printing background, a screen, a solid plastic resin with geometric air bubble inside, and/or a desired combination of listed items within the space. These designs will make the night light exhibit splendid light effects.

Detailed drawings and a detailed description are used to explain the spirit of the current invention as follows:

DRAWINGS

FIG. 1 is an exploded isometric view showing a first preferred embodiment of an LED Night light with interchangeable display unit, in which the display unit has plurality of cut-outs, opening, holes, and/or lines for providing desired light effects.

FIG. 2 to FIG. 10 are isometric views showing second to tenth preferred embodiments of an LED night light with interchangeable display unit with different display area designs and cutouts.

FIG. 12 includes a front view and side and top cross-sectional views of a curved and egg-shell design for a preferred display unit.

FIG. 13 is an isometric view showing a thirteenth preferred embodiment of an LED night light with interchangeable display unit having a tube base and built-in receptacle means to receive a separate display input-end.

Figure 14:
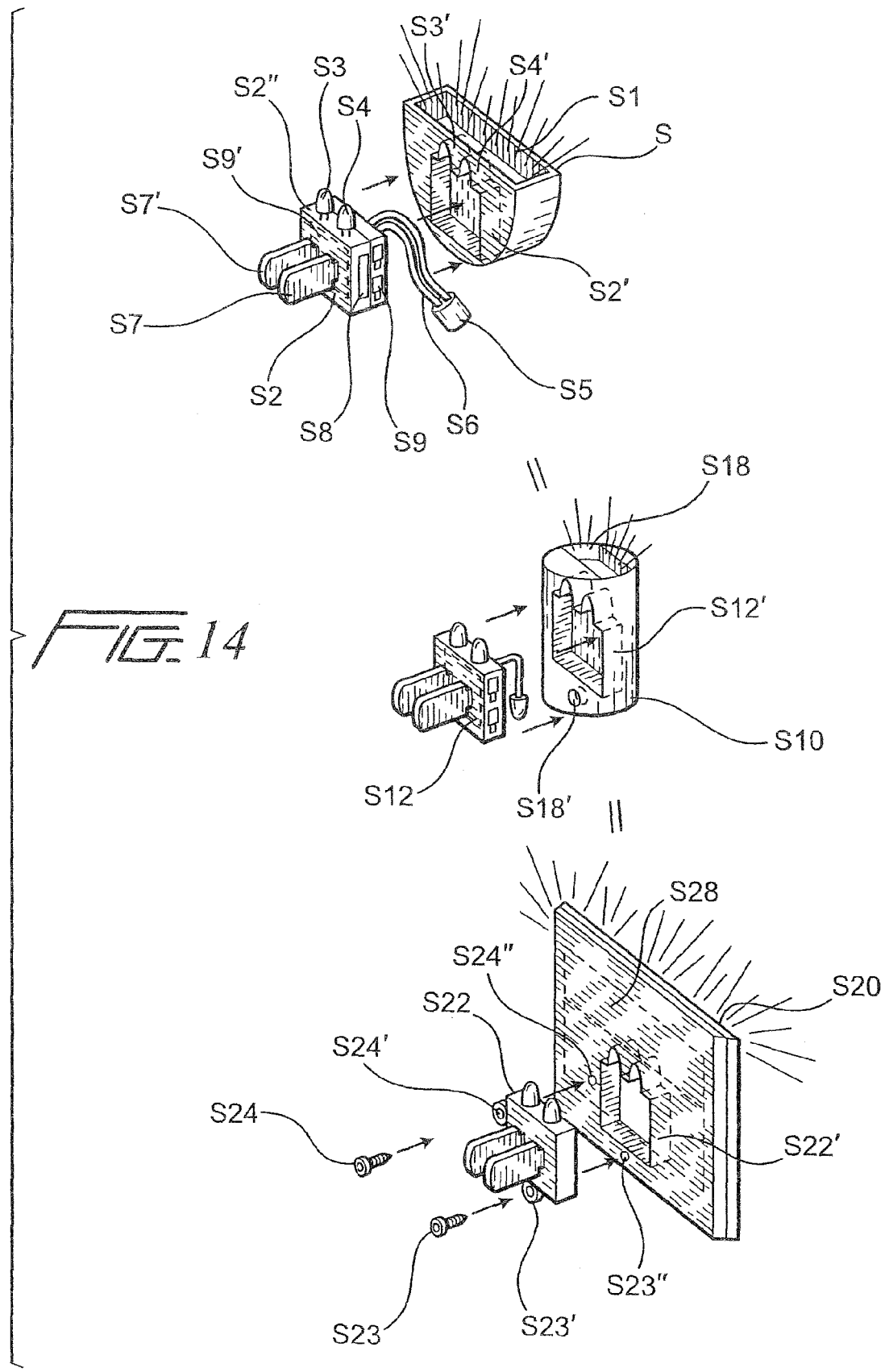

FIG. 14 is an isometric view of a sealed-unit with LEDs that may be fixed on a light device and that can be constructed as a universal model to fit all kinds of night light devices.

DETAILED DESCRIPTION

As shown in FIG. 14, a sealed-unit (S2) (S12) (S22) includes pre-designed openings (S2') (S12') (S22') to allow the universal type of the sealed-unit (S2) (S12) (S22) to fit into openings (S2') (S12') (S22') and use conventional market methods to fasten with the base (S1) (S10) (S20) and thereby assemble the sealed-unit to the night light, for example by means of screws (S23) (S24), welding, sonic sealing, glue, solvent, rivets, catches, or equivalent fixing-means from the convention market that allow the sealed-unit to be fixed in position. The sealed-unit (S2) (S12) (S22) preferably uses a plastic with certain thickness to pass the 94-V-0 flammable grade and meet the safety standard, while all other housing parts (S1) (S10) (S20) can be made of any desired material without limitation because the other housing parts do not touch any live wires. The base (S1) (S10) (S20) can be any shape, configuration, design, curvature, thickness, material, and/or dimension with built-in or separate receptacle means. The sealed-unit has an LED related circuit, control means, and prong means disposed within, and which can be designed to be super slim or wider and thicker but smaller, depending on market requirements. For convenience, the desired unit can be made to fit into different base shapes such as a boat shape (S1), tube shape (S10), and/or rectangular shape (S20) for different night light applications.

The illustrated boat base (S1) has an opening (S2') to allow the sealed-unit (S2) to fit into the space. The sealed-unit (S2) encloses an LED related circuit (S8) and its components (S9), and prong means (S7) (S7') are sealed within the case (S2). The top of the case has two LEDs (S3) (S4) which are connected with the inner circuit (S8) but none of the LEDs' electric legs can be touched by test equipment to make sure a kid's finger will not touch these live wires to cause a dangerous condition. The LED (S5) uses conductive wires (S6) arranged to be pulled far away from the unit's housing (S2) for other illumination arrangements.

The LEDs (S3) (S4) also fit into the base opening (S3') (S4') and a wall (S2") will cover the LEDs after assembly with the base housing. After assembly, the LED light beams can pass though the base's opening area (S) to provide the upper display with good light effects.

The tube base (S10) has an opening (S12') to allow the sealed-unit (S12) to be fitted with two or more LEDs at a desired position and orientation, and a wiring arrangement that allows the light beams to be emitted from the base top opening (S18) and lower window (S18') for desired illumination.

Rectangular base (S20) has a special light arrangement. The LED spot light is directed through a light-medium (S28) to allow the LED light beam to travel within the light-medium (S28) and a majority of light beams to be seen by a viewer from the light-medium (S28) surface in such a way that the viewer will not see any hot spot of cause by the LED light brightness, but rather will see a very soft and even photometric area light for special illumination. Rectangular base (S20) has an opening (S22') that allows the sealed-unit (S22) to be fitted tightly therein and secured with glue, solvent or other adhesive means, sonic means, welding means, catch means, or hook means to assembly with the rectangular housing (S20). The LED will fit into the light-medium's thickness to get the best result.

FIG. 1, shows a preferred LED night light with interchangeable display unit (5). The term interchangeable means that the display unit (5) can be separated from the base (1) when a certain pulling, twisting, pushing, or other force is applied to the said night light without any tools needed. This solves the problem that a user may apply too much torque to the base back area when pulling out the night light and as a result break the night light housing, exposing the prong means (6) (6') to air and cause a risk to people of an electric shock.

The back base (1) has a hole (7) (7') to allow the prong means (6) (6') to pass through and be soldered with the inner Printing Circuit Board (hereafter as PCB) to deliver the power source to the PCB (2) and drive all LED related circuits (a variety items being shown in the drawing) to provide predetermined illumination functions, timing, and control means. The PCB has a hole (22) which can allow the front base (3) central pole to pass therethrough and allow the screw (not shown) to be applied to the back base's hole (15) to fasten the two bases together and seal the PCB(2) and receptacle means (4) within.

The receptacle means (4) has a variety of openings, cutouts, or equivalent windows to allow the LEDs (21) to be installed at an appropriate position (21') to supply the light beams to the display input-end (21") and provide the display unit (5) with desired illumination. The same arrangement is applied to the other two LEDs to align with their respect receptacle's openings and toward the LEDs at the display's input-ends. The display unit (5) has a display area (50) (51) that provides light performance and display input-ends (21") for getting the light beams into the display unit (5).

Figure 11:
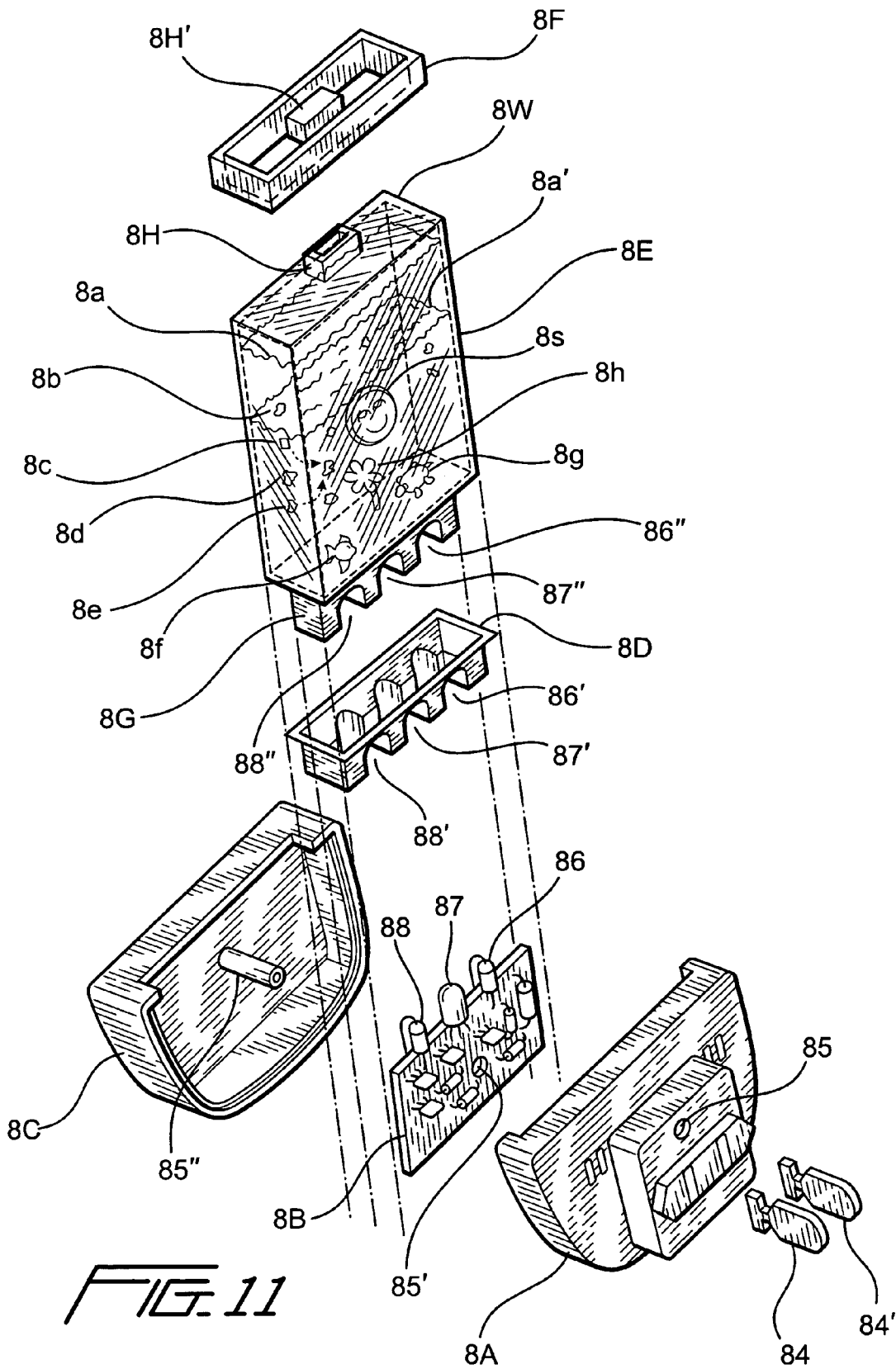
FIG. 11 is an isometric view showing an eleventh preferred embodiment of an LED night light with interchangeable display unit having a space that can be filled with liquid related items and a heat-element to cause the said liquid to move.

As shown in FIG. 11, the current invention has a special design for the display area (8E). The display area (8E) has a geometric shape with space to load liquid (8a), chemical compound (8a'), miniatures (8f) (8g), floating stuff (8s), reflective pieces (8b) (8c) (8d) (8e), liquids of different density (8a) (8a'), a printing background on the back of the housing (8W), a screen (not shown), a solid plastic resin with geometric air bubble inside (not shown), and/or any desired combination of listed items within the space to provide image 8E. The display unit has a top area which is a raised portion (8H) to allow an air-space that enables the moving liquid to exhibit proper functions when a heat-element (86) (88) is applied on the display input-ends (86") (87") though the receptacle means opening (86') (87') to deliver heat from the heat-element to the display input-ends and cause the display inner chemical to become a moving flow and carry all the reflectors to move. This is a very nice effect. The LED (87) can offer different light effects selected from group including steady on, chasing light (while using an LED with three color in one), random, pair flashing, color changing, or any conventional light effects available from the market place. The raised portion (8H) needs a cosmetic cover (8F) to allow the raised portion (8H) to fit within the space (8H') and have a nice viewing appearance. The front (8c) and back base (8A) are sealed by fastening means or screws as discussed above in connection with FIG. 1 to enable fastening by conventional skills.

As shown in FIG. 1, the display unit (5), base (1) (3), or sealed unit (Fig S) material can be selected from any combination of wood, pottery, porcelain, metal, bamboo, poly, plastic resin, paper, textile, weaving stuff, or other conventional material which is available from the marketplace.

In FIG. 1, the display area has a certain treatment that may be selected from opening(s), cut-out(s), hole(s) on its surface to provides the desired light effects and performance.

FIGS. 2 to 10 shows nine alternative styles of the preferable display unit with its display area and display input-end for better understanding.

As shown in FIG. 2, the display unit (20) has plurality of cut out areas (21) and three display input-ends (22).

As shown in FIG. 3, the display unit (30) has a plurality of groove or window areas (31) and three display input-ends (32).

As shown in FIG. 4, the display unit (40) has a plurality of cutouts or window areas (41) and four display input-ends (42).

As shown in FIG. 5, the display unit (50) has a plurality of cut out areas (51) and 3 display input-ends (52).

As shown in FIG. 6, the display unit (60) has a plurality of cut out areas to form the design (61) and three display input-ends (62).

Figure 7:
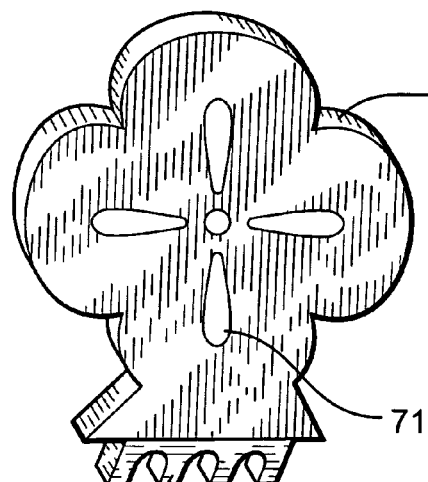

As shown in FIG. 7, the display unit (70) has plurality of cut out areas and window (71) and three display input-ends (72).

Figure 8:
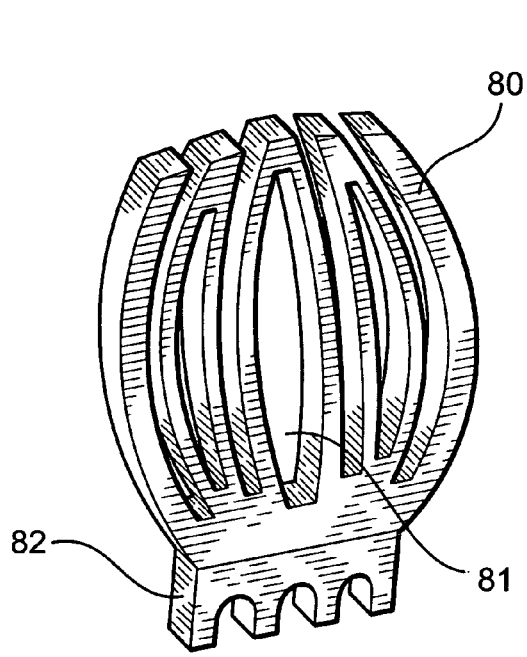

As shown in FIG. 8, the display unit (80) has a plurality of cut out areas (81) that form a tulip flower design and that display input-ends (82).

Figure 9:
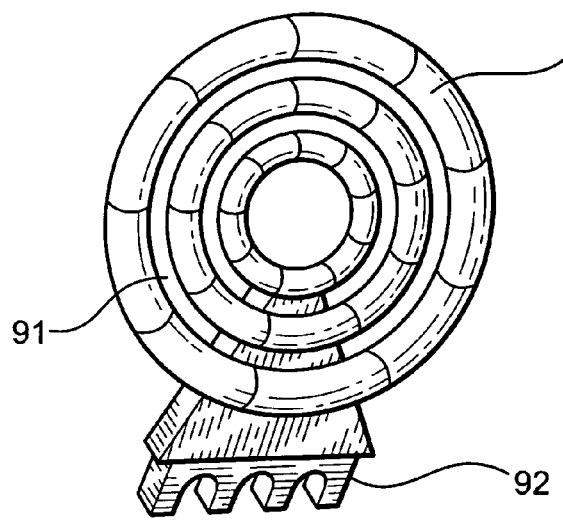
Figure 10:
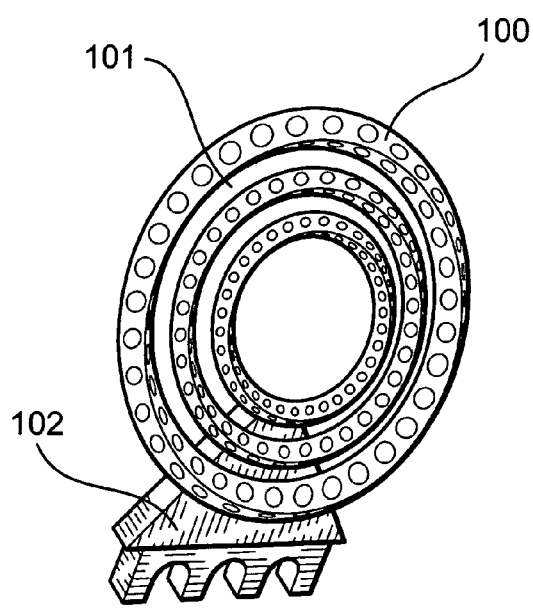

As shown in FIGS. 9 and 10, the display unit (90) (100) has a plurality of cutouts areas (91) (101) that form a multiple level of the round circle design (91) (101) and three display input-ends (92) (102).

As shown in FIG. 12, the alternative display area (140) may have a curved egg-shell shape (146) (146') with a negative (146''') or positive (146'') engraving process applied to provide the inner surface with a three-dimensional image (144) with sufficient depth (146''') or height (146'') to make the design, artwork character, drawing, and/or cartoons look alive. The side viewing angle and top viewing angle show the very dedicated feature of the current invention. The design, artwork, characters, drawing, and/or cartoons with hand painting of the colors will provide a more valuable appearance than any other current cheap models.

FIG. 13 shows an alternative embodiment having a different concept for the receptacle means (130') which are built-in to the base (130). As shown in FIG. 13, the receptacle means (130') are built into the base (130) as one piece, in which the receptacle means prevent the live wires and components from being touched by people and guide the display input-end (133) (133') into the receptacle (131) (13'). The display input-end (133) (133') connects with the receptacle means (131) (131') to get the light (139), heat (not shown), or desired physical phenomenon from the base (130) inner electric device (not shown). The display area (138) has a geometric shape with space to load a liquid (same as FIG. 118E), chemical compound (same as FIG. 11 8E), miniatures (same as FIG. 118E), floating stuff (same as FIG. 118E), reflective pieces (same as FIG. 118E), differing density liquids (same as FIG. 118E), printing background, screen, solid plastic resin with geometric air bubble inside (138), or a desired combination of listed items within the said space. The display unit (138) is inserted into the hole of input-end (137) with a temporary fix which can be separated by a pulling, pushing, twisting force to enable the display unit to separate from the input-end to make it safer. As shown in FIG. 13, the base has an LED (139) on top of the receptacle means (132). The two cutouts (131) (131') allow the two posts (133) (133') to pass through the two cutouts (131) (131') of the ring (132) so that the two posts (133) (133') of the display input-end (137) can push down to a lower level of the ring (132) and twist the display input-end housing (137) to cause the two posts (133) (133') to be held and tightened by the location of ring (132) at a location where the cutouts (131) (131') are not present. This is an alternative embodiment which has functions that are equivalent to those of the embodiments of FIGS. 1 and 11, although any minor deviation, changes, and/or improvements will still fall within the spirit of the current invention.

It is appreciated that the above description, embodiments, prior art, and so forth are not limited to those described above. Any equivalent function, replacement, alternative process, treatments, experiments, and arrangements may still belong to and/or fall within the scope of the current invention.

The invention claimed is:

1. An interchangeable night light system including an LED night light arranged to receive at least two different interchangeable display units, comprising:

two different display units each having a different display area and a display input end through which light is transmitted to said display area, each display input end of each of said different display units being arranged to be received in a base, said base having at least one prong means for connecting with a power source and one receptacle means for receiving the display input ends of said two different display units without any exposing parts in said base that carry electricity and thereby enable a user to safely and interchangeably assemble either of said display units to said base;

at least one LED connected by circuitry to a control means and the prong means to cause the LED to turn on for a period of time and to exhibit predetermined illumination effects selected from the group consisting of flashing, steady-on, chasing, random flashing, color changing effects, wherein:

the at least one LED extends through an opening in said receptacle means, and said display input end extends into and is received by said receptacle means, the display input end includes means for receiving said at least one LED when said display input end is inserted into said receptacle means, and for transmitting light to the respective display area of each different display unit from the LED in the base, at least one of the display units is a single piece, and the display area of the at least one of the display units further has a predetermined design selected from the group consisting of openings, cut-outs, and holes on its surface to provide desired lighting effects and performance, and said receptacle means is arranged to receive any display units having display input ends with same dimensions and configuration of said display input end to thereby enable said any display units to be interchangeably assembled and connected to said base without risk of said person touching said parts that carry electricity.

2. An interchangeable night light system including an LED night light arranged to receive at least two different interchangeable display units, comprising:

two different display units each having a different display area and a display input end through which light is transmitted to said display area, each display input end of each of said different display units being arranged to be received in a base, said base having at least one prong means for connecting with a power source and one receptacle means for receiving the display input ends of said two different display units without any exposing parts in said base that carry electricity and thereby enable a user to safely and interchangeably assemble either of said display units to said base;

at least one LED connected by circuitry to a control means and the prong means to cause the LED to turn on for a period of time and to exhibit predetermined illumination effects selected from the group consisting of flashing, steady-on, chasing, random flashing, color changing effects, wherein:

the receptacle means of the base is arranged to prevent a person from touching any part that carries electricity in the receptacle means when connected with the display input end, the at least one LED extends through an opening in said receptacle means, and said display input end extends into and is received by said receptacle means, the display input end includes means for receiving said at least one LED when said display input end is inserted into said receptacle means, and for transmitting light to the respective display area of each different display unit from the LED in the base, the display area of at least one of the display units includes a space for at least one filler selected from the group consisting of a liquid, chemical compound, miniature objects, floating stuff, reflective pieces, liquids of different density, a printed background, a screen, and a combination of said fillers, and said receptacle means is arranged to receive any display units having display input ends with same dimensions and configuration of said display input end to thereby enable said any display units to be interchangeably assembled and connected to said base without risk of said person touching said parts that carry electricity.

3. An interchangeable night light system including an LED night light arranged to receive at least two different interchangeable display units, comprising:

two different display units each having a different display area and a display input end through which light is transmitted to said display area, each display input end of each of said different display units being arranged to be received in a base, said base having at least one prong means for connecting with a power source and one receptacle means for receiving the display input ends of said two different display units without any exposing parts in said base that carry electricity and thereby enable a user to safely and interchangeably assemble either of said display units to said base;

at least one LED connected by circuitry to a control means and the prong means to cause the LED to turn for on a period of time and to exhibit predetermined illumination effects selected from the group consisting of flashing, steady-on, chasing, random flashing, color changing effects, wherein:

the receptacle means of the base is arranged to prevent a person from touching any part that carries electricity in the receptacle means when connected with the display input end, the at least one LED extends through an opening in said receptacle means, and said display input end extends into and is received by said receptacle means, the display input end includes means for receiving said at least one LED when said display input end is inserted into said receptacle means, and for transmitting light to the respective display area of each different display unit from the LED in the base, the display area of at least one of the display units has a curved egg-shell shape with engraving to provide a three-dimensional effect and enable designs, artwork, characters, drawings, and cartoons to appear more lifelike, and said receptacle means is arranged to receive any display units having display input ends with same dimensions and configuration of said display input end to thereby enable said any display units to be interchangeably assembled and connected to said base without risk of said person touching said parts that carry electricity.

4. An interchangeable night light system including an LED night light arranged to receive at least two different interchangeable display units, comprising:

two different display units each having a different display area and a display input end through which light is transmitted to said display area, each display input end of each of said different display units being arranged to be received in a base, said base having at least one prong means for connecting with a power source and one receptacle means for receiving the display input ends of said two different display units without any exposing parts in said base that carry electricity and thereby enable a user to safely and interchangeably assemble either of said display units to said base;

at least one LED connected by circuitry to a control means and the prong means to cause the LED to turn for on a period of time and to exhibit predetermined illumination effects selected from the group consisting of flashing, steady-on, chasing, random flashing, color changing effects, wherein:

the receptacle means of the base is arranged to prevent a person from touching any part that carries electricity in the receptacle means when connected with the display input end, the at least one LED extends through an opening in said receptacle means, and said display input end extends into and is received by said receptacle means, the display input end includes means for receiving said at least one LED when said display input end is inserted into said receptacle means, and for transmitting light to the respective display area of each different display unit from the LED in the base, the display area of at least one of the display units has a geometric shape with space for at least one filler selected from the group consisting of a liquid, chemical compound, miniature objects, floating stuff, reflective pieces, liquids of different density, a printed background, a screen, a solid plastic resin with an air bubble inside, and a combination of said fillers, and said receptacle means is arranged to receive any display units having display input ends with same dimensions and configuration of said display input end to thereby enable said any display units to be interchangeably assembled and connected to said base without risk of said person touching said parts that carry electricity.

* * * * *